INVENTORS
Michael John Harris
GORDON HOWARD TOWNEND
BY
ATTORNEY

United States Patent Office

2,886,693
Patented May 12, 1959

2,886,693
SPARK MACHINING APPARATUS

Michael John Harris, Wolverhampton, and Gordon Howard Townend, Wightwick, near Wolverhampton, England Application August 12, 1957, Serial No. 677,508

14 Claims. (Cl. 219—69)

This invention relates to spark machining apparatus of the kind (hereinafter referred to as being of the kind specified) wherein small elementary particles of the workpiece material are removed by establishing between a tool electrode and the workpiece a series of disruptive electric spark discharges whilst the tool electrode and the workpiece in the locality of such spark discharges are subjected to a cooling fluid usually in the form of a liquid dielectric, such as paraffin oil, relatively movable supports being provided for the tool electrode and workpiece, and the spark producing voltage being furnished across a condenser which is connected to a charging circuit adapted to control the rate of charging from a source of direct current and is also connected to a discharge circuit containing the tool electrode and workpiece (when the latter is mounted in the apparatus).

One of the difficulties in obtaining satisfactory operation of apparatus of this kind is that the electric discharge between the tool electrode and the workpiece when once established by the passage of a spark tends to be prolonged into an arc discharge due to the setting up of ionised conditions in the spark gap through the passage of a spark. The arcing condition of this kind is disadvantageous for a number of reasons among which may be mentioned that energy tends to be liberated in the form of heat in the arc itself instead of doing work in disrupting the material of the workpiece.

Furthermore, even when arcing conditions are set up for only a proportion of the time of operation of the apparatus and at other times the desired spark discharge is established the arcing conditions which do occur are found to impair to a serious degree of accuracy of machining as well as the surface finish of the machined part of the workpiece.

One of the objects of the invention is to reduce the tendency for arcing conditions to be established thereby improving the accuracy of machining and improving the surface finish which can be attained in respect of workpieces undergoing machining in the apparatus.

The invention is further concerned with other factors which determine the accuracy of machining and the quality of the surface finish. In order to attain accurate machining and a high rate of removal of material from the workpiece it is important to maintain a spark gap of a predetermined length between the tool electrode and the workpiece. If the gap is too short spark discharge takes place at a lower voltage and consequently the quantity of charge on the condenser which passes across the spark gap during spark discharge is reduced and the disruptive effect is smaller whilst there is also inherently a greater possibility of arcing conditions being established and when this occurs the surface finish of the workpiece is impaired as well as the accuracy of machining. On the other hand if the spark gap is too long spark discharge will not occur at all or the repetition frequency of the spark discharge may be so reduced, because no discharge takes place until after the fairly prolonged and gradual voltage rise occurring towards the upper end of the normal exponential charging of the condenser, that the reduced number of disruptions occurring in a given time more than offset the somewhat greater energy liberated in each spark discharge so that the rate of removal of material from the workpiece is reduced.

To established a spark gap of predetermined length best suited to the particular tool electrode, material of the workpiece, and shape and size of the hole, recess, or cut to be made therein, the support for the tool electrode and the support for the workpiece require to be maintained accurately in predetermined relative positions throughout the machining operation without being disturbed by any mechanical forces arising from the spark discharge itself which may be exerted on the workpiece or tool electrode, whilst one at least of these supports requires to be movable relatively to the other and to have imparted thereto such feed movement as will maintain a spark gap of predetermined length as material is removed from the workpiece.

A further object of the invention is thus to provide spark machining apparatus including new or improved means for effecting the relative feed movement required between the supports for the tool electrode and workpiece respectively and for maintaining the opposed surfaces of the tool electrode and workpiece between which the spark passes at a predetermined separation throughout the machining operation.

Other objects and advantages of the invention will become apparent from the following detailed description wherein preferred embodiments of the invention are described by way of example and wherein:

Figure 1:
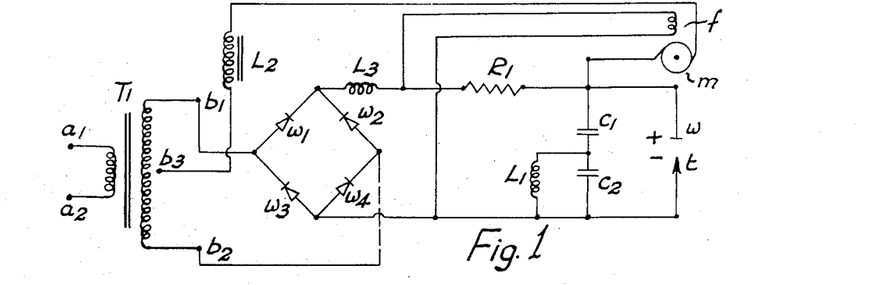
Figure 1 is a circuit diagram showing one arrangement in accordance with the invention.

Referring firstly to Figure 1 the tool electrode and workpiece are indicated respectively at $t$ and $w$ one of these, conveniently the tool electrode, being mounted on a movable support or arbor which is connected operatively with a feed motor $m$ through transmission means affording a suitably high velocity ratio for example from 10,000:1 to 15,000:1 and negligible lost motion.

The transmission means between the motor and the arbor may include a gear unit of the conventional worm and worm wheel type affording a ratio of about 1,000:1 and a friction drive unit providing a further reduction of up to 15:1.

The motor $m$ comprises a rotor having a low resistance winding for example up to 20 ohms, one end of which is connected to the discharge circuit conveniently at the point of connection between the resistor R1, condenser C1 and tool electrode $t$, and the other end of which is connected through an inductive impedance L2 to tapping point $b3$ at the centre of the secondary winding of transformer T1.

The field winding $f$ of the motor may be energised from any suitable direct current source and is shown, by way of example, as connected in parallel across the output terminals of the bridge circuit rectifier backwardly of the resistor R1. Alternatively a motor having a permanent magnet field system may be employed.

The wave-form of voltage appearing between the tool electrode $t$ and workpiece $w$ and also between the upper end of condenser C1 and the lower end of condenser C2 consists of a series of vertical or very steep fronted discharge wave fronts with intervening charging or recovery wave fronts of exponential form such as is well known to occur in the charging of a condenser through the resistive branch of a charging circuit.

By making a connection from the upper end of the condenser C1 through the low resistance winding of the rotor of motor $m$ and to the center tap $b3$ of transformer T1 and the rotor is effectively subjected to an alternating component of voltage (arising from the wave-form in the discharge circuit above described) plus a direct component of voltage depending upon the peak value of voltage attained immediately prior to spark discharge. It will be evident that for a certain value of such peak voltage, the area enclosed by the wave-form of voltage above an abscissa representing the D.C. voltage of the tapping point $b3$ will be equal to the area enclosed by the wave-form below this abscissa. This represents an equilibrium condition in which there is no direct current component through the armature of the motor which remains stationary, the peak voltage referred to being that which will cause a spark to pass across a spark gap of the desired length, the alternating current component due to the alternating voltage being suppressed or reduced to a very low value by virtue of the impedance of the inductance L2.

As the spark gap increases in length with removal of material from the workpiece the voltage across the spark gap which must be attained before spark discharge can occur increases and the current flow through the rotor of motor $m$ is in such a direction that this then tends to move the support for the tool electrode to reduce the spark gap length.

Any over-run of the rotor beyond the point at which the direct component of current through the rotor is reduced to zero produces a corrective or braking current of a value which is related to the speed of rotation of the rotor in its approach to the zero or equilibrium setting. Therefore the tendency to over-run is very effectively counter-acted in that the braking force will be automatically increased as the factors tending to produce over-run, i.e. high speed of rotation of the rotor in its approach to the zero or equilibrium position, become more severe.

The D.C. resistance in the circuit containing the rotor winding is made up of that afforded by the secondary winding of the transformer T1, the inductance L2, the rectifiers $w1$ to $w4$ and the resistor R1. Of these only the latter significantly limits the current and it will be appreciated that conduction across the spark gap between the tool electrode and the work provides an effective resistance in parallel with R1 which reduces its current limiting effect.

For a transformer T1 providing output voltage of 250 volts R.M.S. the circuit components referred to above may have the following values:

R1 _______________ 10 to 500 ohms.
C1 _______________ 0.01 microfarad to 10 microfarads.
L2 _______________ 1–10 millihenries.
L3 _______________ 6 millihenries.
Rectifiers $w1$ to $w4$ _. Type Sentercel D112/15/IW.

Figure 2:
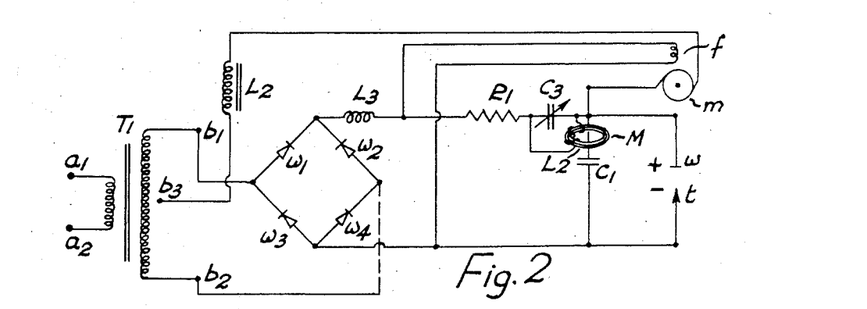
Figure 2 is a circuit diagram showing an alternative arrangement in accordance with the invention.

These arrangements with regard to the connection and supply of current to the rotor or the motor $m$ are common to both the circuit arrangement illustrated in Figure 1 and that illustrated in Figure 2.

Referring now to the arrangements for suppressing arc formation between the tool electrode $t$ (negative) and workpiece $w$ (positive) and particularly to the arrangement illustrated in Figure 1 it will be evident that the condenser C1 is charged from a charging circuit including the charging resistor R1 and inductance L3 fed with direct current from a current supply device comprising transformer T1 having primary terminals $a1$, $a2$ and secondary terminals $b1$, $b2$, $b3$ as indicated, of which $b1$ and $b2$ feed one pair of diagonally opposed points of a bridge circuit rectifier including rectifiers $w1$, $w2$, $w3$ and $w4$.

The charging circuit is connected to the other pair of diagonally opposite points of this bridge circuit rectifier.

The bridge circuit rectifier provides rectified but un-smoothed D.C. potential of a suitable value across the last said pair of diagonally opposite points, a voltage of 250 R.M.S. being typical. When the transformer T1 is supplied from the mains at 50 cycles the frequency of the alternating current component present in the rectified but un-smoothed output from the bridge circuit rectifier will of course be 100 cycles per second.

In operation of the circuit the motor $m$ moves the arbor which supports the tool electrode $t$ towards the workpiece $w$ and a series of spark discharges occur between the tool electrode and the workpiece. Each spark discharge serves to discharge the condenser C1, providing a vertical or nearly vertical discharge voltage wave front across the condenser, which in the absence of further components comprising condenser C2 and inductance L1, would commence to re-charge presenting an exponentially increasing voltage in the known manner until the break-down voltage across the spark gap was again attained resulting in a further spark discharge.

Figure 3:
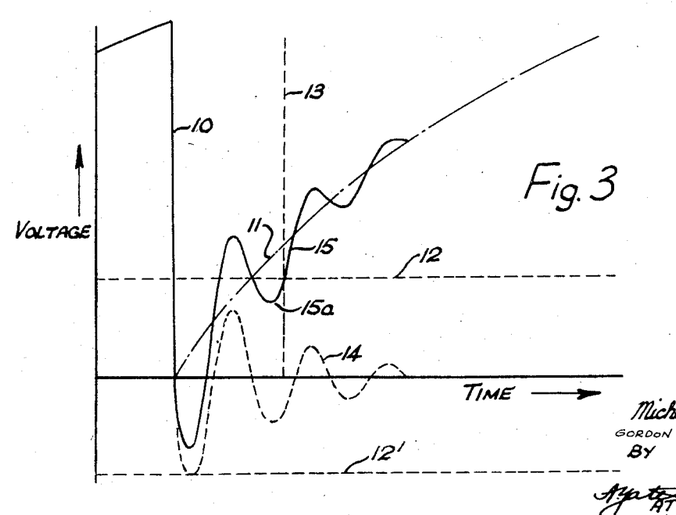
Figure 3 is an explanatory diagram illustrating the resultant recovery wave-form of voltage across the condenser and spark gap following spark discharge.

The broken line 12 represents the arc extinguishing positive voltage which may be of the order of 20 volts and the broken line 12' represents the corresponding arc extinguishing negative voltage. When the voltage across the spark gap is maintained below this value any arc which is present will be extinguished, but if the voltage rises above this value arc discharge may occur. This condition persists for a certain period after the occurrence of a spark discharge the duration of which has not been precisely determined but which for the purpose of the present explanation of the invention will be assumed to be represented by the interval between the spark discharge wave front 10 and the ordinate 13. This condition will thereafter be replaced by one in which electrical discharge does not occur until a much higher voltage is attained which condition may broadly be termed a sparking condition. As previously explained it is desired to prevent electrical discharge occurring during the time interval referred to that is between the wave front 10 and ordinate 13, or to extinguish such discharge if it does occur, in order that the electrical energy supplied to the spark gap shall be dissipated wholly or mainly by way of spark discharge which is useful for spark machining whereas arc discharge is not useful and impairs the accuracy and finish of the machining operations performed by spark discharge.

It will be observed that in the latter part of the interval bounded by the lines 10 and 13 the recovery voltage 11 across the condenser would, in the absence of the circuit arrangement provided for arc suppression, rise appreciably above the arc extinguishing value indicated by the line 12, and if electrical discharge were not extinguished or fully extinguished during the initial part of this interval when the recovery voltage was below the arc extinguishing value arc discharge would then take place and would prevent the condenser becoming charged as well as producing the disadvantageous effects previously referred to.

To avoid or reduce this possibility an oscillatory circuit is provided comprising the inductance L1 and the condenser C2 in which an oscillatory voltage is established by the shock excitation of the spark discharge, this oscillatory voltage being represented in Figure 3 by the broken line wave-form 14.

Since the oscillatory circuit consisting of the inductance L1 and condenser C2 is connected in series in the discharge circuit from condenser C1 through the spark gap between the tool electrode and the workpiece w the oscillatory voltage 14 is added to the recovery voltage 11 and produce a resultant recovery voltage indicated in full lines by the wave-form 15.

It will be observed that between lines 10 and 13 the wave-form 15 includes 1½ complete cycles of superimposed oscillatory voltage 14, but it will be understood that it could contain a greater number of cycles than this if desired.

The second negative going halfcycle is of sufficient amplitude to produce a resultant recovery voltage indicated by the full line 15 which is well below the arc extinguishing voltage 12 as indicated particularly by the trough 15a. Although the recovery voltage may during the interval between the lines 10 and 13 exceed the arc extinguishing voltage 12 it does nevertheless have at least two distinct excursions well below this voltage, the latter occurring near the end of the interval when the ionisation in the spark gap has had time to disperse.

Furthermore it will be appreciated that the waveform of the current supplied to the condenser C1 periodically goes to zero and that since the repetition frequency of sparking is very much higher than the supply frequency of the charging current, typically being 100 kilocycles as against 100 cycles, a charging voltage less than the arc extinguishing voltage represented by the line 12 will occur periodically and will persist for a very considerable period in comparison with the time interval represented by the spacing between lines 10 and 13 therby effectively extinguishing any previously persisting arc.

Utilising a spark gap of about 0.002" and a charging voltage of 250 volts R.M.S. and a dielectric fluid such as paraffin oil the condenser C1 may have a value ranging from 0.01 microfarad to 10 microfarads, the charging resistor R1 a value ranging from 10 to 500 ohms, and the inductance a value of about 60 millihenries.

The inductance L1 may have a value of from 1 to 10 microhenries and the condenser C2 a value which is approximately one to four times the value of the condenser C1.

For the higher values of condenser C1 for example above 0.25 microfarad it is preferred to utilise the circuit illustrated in Figure 2 wherein components corresponding to those of Figure 1 have been designated by the same reference characters. The arrangement shown in Figure 2 avoids providing a high capacity condenser such as C2 which is expensive.

In this alternative circuit arrangement the oscillatory circuit for producing the superimposed voltage 14 in Figure 3 comprises an inductance L2 connected in parallel with a condenser C3 this combination being connected in series in the charging circuit for the condenser C1 conveniently between resistor R1 and condenser C1. The value of C3 may be varied by selection in relation to the value of C1, being from about one to four times that of C1, or a variable condenser may be used for C3.

The oscillatory voltage produced in this circuit is imposed upon the recovery voltage of condenser C1 by an inductive connection comprising a ring or loop M of suitable magnetically conductive material of low reluctance, for example that known as "ferroxcube" which encircles the lead to condenser C1 and upon which is wound the coils of inductance L2.

The arrangement is preferably such that at or near the peak values of current in the oscillatory circuit the ring or loop M is saturated so that the crests and troughs of the resultant recovery voltage wave-form indicated by the line 15 would be somewhat flattened.

Typically the inductance L2 may comprise some 50 turns, whilst the condenser C3 may be of a selected value ranging from 0.01 microfarad to 0.10 microfarad.

It will be further understood that if desired both the oscillatory circuit illustrated in Figures 1 and 2 may be utilised in combination with the same condenser charging resistor and spark gap circuit.

Instead of charging the condenser C1 through a current limiting branch consisting of the resistor R1 and inductance L3, a purely resistive branch may be employed or other means such as a current limiting valve circuit may be employed.

Referring to the constructional form of the apparatus as shown in Figures 4 to 8 this comprises a base plate 110 which in operation of the apparatus stands within a tank (not shown) containing a suitable fluid such as paraffin oil, covering the spark gap established between a tool electrode and a workpiece when these are mounted in the apparatus. A suitable form of pump may be provided to cause flow of the fluid through the said spark gap.

Figure 4:
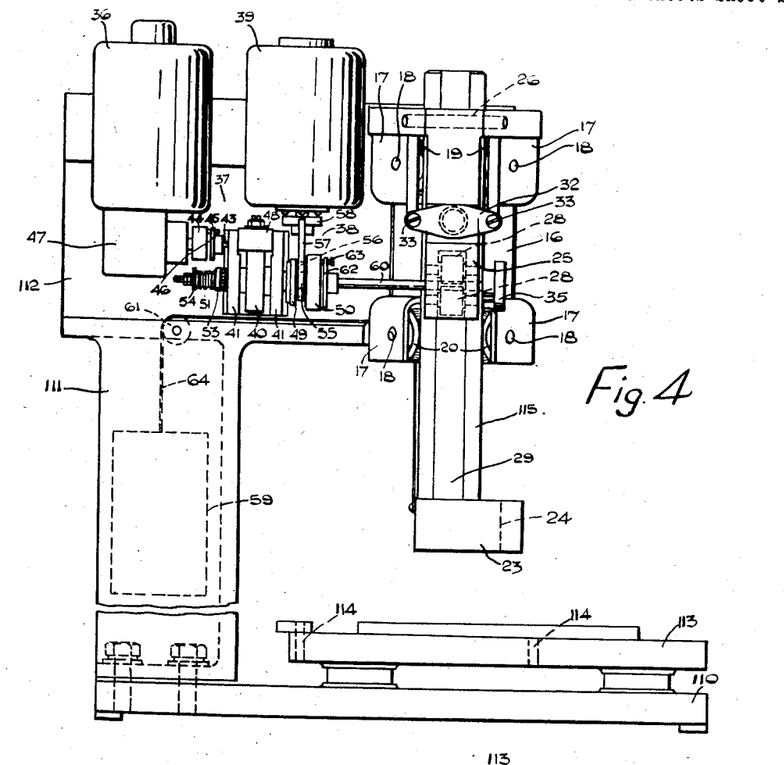
Figure 4 is a view in front elevation of one constructional form of spark machining apparatus in accordance with the invention.

At one side of the base plate is mounted an upstanding pedestal portion 111 which may be of any suitable form, for example box-section or channel-section in plan cross section and which at its upper end is provided with a head member comprising a plate 112 disposed in a vertical plane and projecting laterally from the side of the pedestal nearest the centre of the base plate 110 so as to overhang that portion of the base plate upon which is mounted a support 13 for the workpiece.

Figure 5:
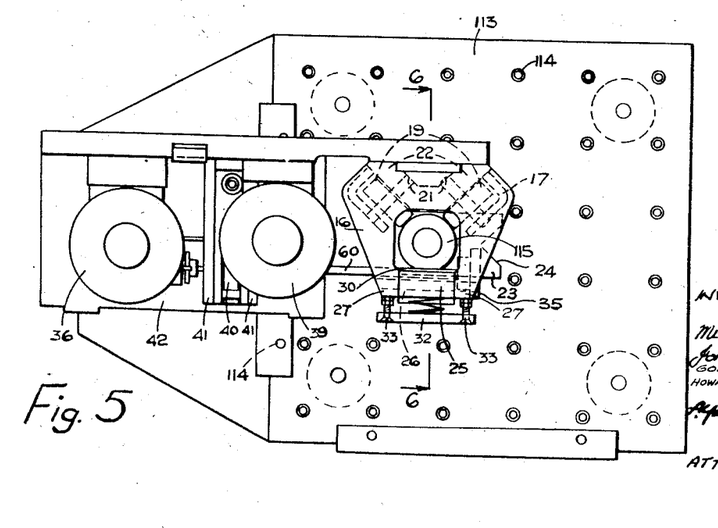
Figure 5 is a plan view of the construction shown in Figure 4.
Figure 6:
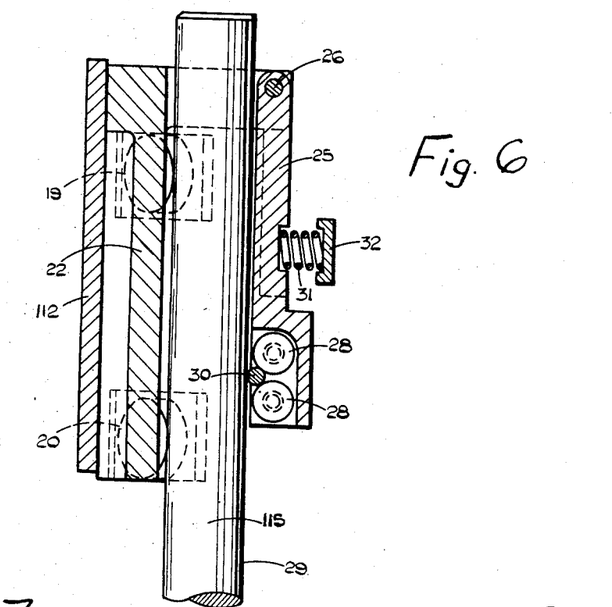
Figure 6 is a fragmentary view on an enlarged scale and in cross section on the line 6—6 of Figure 7.

The workpiece support 113 may be of any suitable form comprising for example a horizontal plate which as seen in Figure 5 of the drawings is formed with tapped holes 14 at regularly spaced positions to enable any suitable clamping structure to be secured to the plate 113 for the purpose of holding a workpiece in position thereon.

The head plate 112 serves to support at its inwardly projecting end a guide structure for a tool arbor 115, this guide structure comprising a generally channel-shaped member 16 having its base or back portion secured to the inner margin of the head plate 112 so that the channel afforded by this member extends vertically.

The member 16 includes at its upper and lower extremities bracket portions 17 including limbs disposed in vertical planes oblique to the head plate 112, these limbs being provided with bearings indicated generally at 18 for supporting one end of each of two pairs of rollers, the upper pair being designated 19 and the lower pair 20.

The other ends of each of these rollers are supported in suitable bearings as indicated in the case of the upper pair at 21 accommodated in the base portion 22 of the channel-shaped member 16, this base portion being of V shape in cross section.

The tool arbor 115 is provided with a holder portion 23 at its lower end including a V-shaped slot 24 in which the tool electrode may be clamped by means of a bridgepiece (not shown) which would close the open mouth of the slot 24, the upper portion of the tool arbor being disposed in the channel of the member 16 and engaging with the pairs of rollers 19 and 20 at positions spaced apart angularly by 90° from each other as seen in Figure 5.

In the mouth of the channel afforded by the member 16 is mounted an arm 25 which is dependent from a pivot pin 26 at its upper end, the ends of this pivot pin being journalled in the extremities 27 of the limbs or side members of the channel-shaped member 16 at its upper end.

The dependent arm 25 carries at its lower end a pair of backing rollers 28 mounted between the limbs of a recessed portion of channel-shape in cross section at the lower end of the arm 25 about vertically spaced parallel axes.

Between the backing rollers 28 and a flat plane face 29 machined or otherwise formed on the tool arbor 115 is disposed an input roller constituted in the particular construction illustrated by the end portion 30, of a spindle, this being urged into non-slipping driving contact with the face 29 by means of the backing rollers which engage with this spindle portion 30 at positions forwardly of a vertical plane passing through its diameter.

The arm 25 carrying the backing rollers is acted upon by a coiled compression spring 31 operating between the forwardly presented face of this arm and a bridge-piece 32 secured to the channel-shaped member 16 by screws 33 engaging threadably in the forwardly projecting spacing blocks secured to the limbs of the channel-shaped member 16.

In order to enable the position of the tool arbor 115 to be adjusted manually the spindle portion 113 is provided with a knob or hand wheel 35 at its end.

The spindle portion 30 is driven from an electric drive motor 36 secured to the portion of the head plate 112 above the pedestal 111 through the intermediary of a friction gear unit 37 and a friction differential gear 38, the third element of the latter being oscillated by an electric motor 39 hereinafter termed the vibrator motor and also mounted on the head plate alongside the drive motor 36.

The unit 37 may comprise an output element in the form of a wheel or disc 40 journalled for rotation about a horizontal axis between spaced trunnion plates 41 disposed on a horizontal platform portion 42 of the head above the upper end of the pedestal. The input element of the unit may comprise an extension of the spindle 43 which is connected through a coupling comprising disc elements 44 and 45, the former of which has a pin 46 engaging in a slot in the element 45 establishing a positive drive free from lost motion between the two elements but allowing some movement of the disc element 45 in its own plane, to the output gear box 47 of the drive motor 36.

The portion of the spindle 43 which comprises the input element of the unit 37 is maintained in pressure contact with the periphery of the wheel or disc 40 by means of a pair of backing rollers (not shown) which may be similar to the backing rollers 28 and carried by a pressure plate 48 pivoted about a horizontal axis at or near its rear end and acted upon by a coiled tension spring extending between the forward end of the plate 48 and an anchorage in the plate 42 so as to urge the backing rollers towards the spindle 43 in a manner similar to the dependent plate 25.

It will be appreciated that the gear box 47 may include toothed gearing such as a worm and worm wheel, or bevelled gears, the degree of lost motion measured at the pitch line of engagement between these gears being of the normal order of 0.001 to 0.002 of an inch. Owing to the velocity ratio afforded by the transmission means from the spindle 43 to the spindle portion 30, this degree of lost motion in the motor gear box is immaterial.

The velocity ratio of the unit 37 may be from 10:1 to 15:1 the diameter of the final gear of the gear box 47 may be about 1 inch whereas the diameter of the spindle 60 may be about ¼ inch so that any lost motion occurring at the periphery of the first mentioned gear is produced by a factor of from 40 to 60 at the tool arbor.

Figure 7:
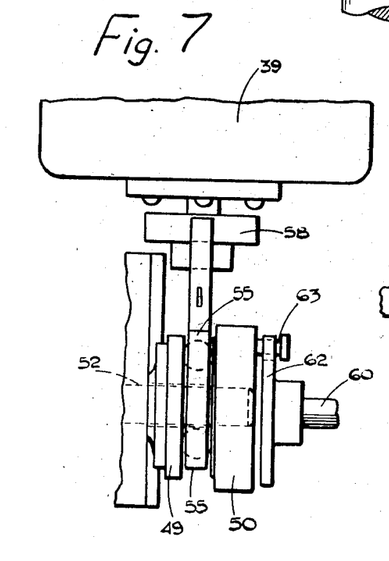
Figure 7 is a further fragmentary view on an enlarged scale of the differential gear through which the drive from the motor to the arbor is effected.

The differential gear 38 comprises disc-like input and output elements 49 and 50 journalled co-axially with each other, the element 50 being acted upon by spring means urging it towards the element 49.

Figure 8:
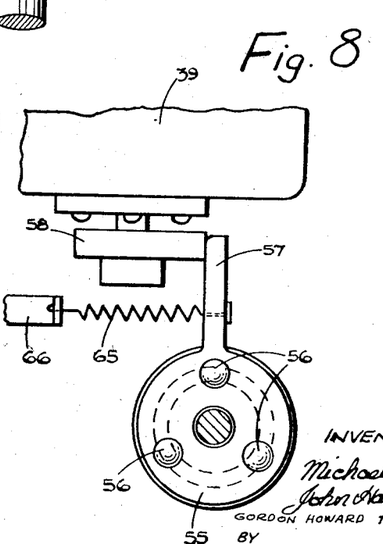
Figure 8 is a further fragmentary view of the differential gear showing the arrangement of ball cage loading spring and actuating cam.

These spring means may comprise a coiled compression spring 51 disposed on spindle 52 and bearing at one end against one member 53 of a thrust ball race and at the other end against a thrust washer 54 from which the axial thrust is transmitted to the disc element 50 through the spindle 52.

Between the disc elements 49 and 50 is disposed a third element of the differential gear which is in the form of a cage or annulus 55 containing a plurality of planetary elements, such as balls 56.

The input and output elements 49 and 50 are grooved on their opposed parallel faces to receive the balls 56 whereby the cage or annulus 55 is automatically centered. The arm 57 is maintained in contact with the cam 58 by means of a tension spring 65 connected at one end to the arm 57 and at its other end to an anchor bracket 66 which may be secured to the head plate 112 of the supporting structure.

The cage or annulus is provided with an arm 57 which engages with the periphery of a cam 58 on the shaft of the vibrator motor 39 so that the cage or annulus is continuously oscillated through an angle such as to produce displacement of the tool arbor 115 of the order of 0.00075 to 0.001 inch.

The output disc element 50 of the differential gear is operatively connected with the spindle 30 through a coupling similar to that which connects the drive motor to the unit 37, one element of this coupling being constituted by the disc element 50 itself and the other by a further disc element 62 which has a slot for receiving the axially projecting pin 63 of the disc element 50. The disc element 62 is free to move to a limited extent in its own plane (without incurring any angular lost motion through the coupling) so that the portion of the spindle 30, which is acted upon by the backing rollers 28, is not subjected to any constraint in movement towards and away from the transmission face 29 and thus is maintained in pressure contact therewith to transmit the drive in a non-slipping manner by the backing rollers and associated spring loading means already described.

The weight of the tool arbor is counter-balanced by a counter-balance weight 59 which may be accommodated in the pedestal and which is connected to the tool arbor by means of a cable 64 which passes over pulleys of which one is seen at 61.

What I claim then is:

1. Spark machining apparatus comprising, a workpiece support and a tool electrode support movable relatively to each other, a rotary electric motor, transmission means of high velocity ratio and affording only negligible lost motion connecting said motor and at least one of said supports, to maintain a workpiece and tool when respectively supported thereby spaced apart from each other by a spark gap, said motor having a rotor and a low resistance winding controlling, according to the direction of direct current flow therethrough, the direction of rotation of said rotor, a source of direct current, a spark charge condenser having a positively charged plate and a negatively charged plate, a charging circuit connecting said source and said condenser and including means controlling the rate of charging of said condenser, a discharge circuit connecting said positively and negatively charged plates with said workpiece and tool electrode supports respectively, whereby said condenser is repeatedly discharged by passage of a spark across said spark gap and re-charged after each such discharge, said discharge circuit having a connection point for one end of said low resistance winding, this connection point having a voltage wave form comprising a series of discharge wave fronts with intervening recovery wave fronts the peak value of the voltage varying with the length of said spark gap, said supply source having a connection point for the other end of said low resistance winding between which point and output terminals of the supply source the latter affords low resistance, said low resistance winding being connected between said connection points, to complete a circuit through said low resistance winding having sufficiently low resistance to limit overrun of said motor to a small value, and thereby maintain said length of said spark gap substantially constant.

2. Spark machining apparatus comprising, a workpiece support and a tool electrode support movable relatively to each other, a rotary electric motor, transmission means of high velocity ratio and affording negligible lost motion connecting said motor and at least one of said supports, to maintain a workpiece and tool when respectively supported thereby spaced apart from each other by a spark gap, said motor having a rotor and a low resistance winding controlling, according to the direction of direct current flow therethrough, the direction of rotation of said rotor, a source of direct current including an alternating current supporting circuit of low output impedance and a rectifier circuit fed therefrom, said alternating current supply circuit having an output tapping point substantially at its electrical centre, a spark charge condenser having a positively charged plate and a negatively charged plate, a charging circuit connecting said source and said condenser and including means controlling the rate of charging of said condenser, a discharge circuit connecting said positively and negatively charged plates with said workpiece and tool electrode supports respectively, whereby said condenser is repeatedly discharged by passage of a spark across said spark gap and re-charged after each such discharge, said winding of said motor being connected electrically between said tapping point and one plate of said condenser, to complete a circuit through said low resistance winding having sufficiently low resistance to limit over-run of said motor to a small value, and thereby maintain said length of said spark gap substantially constant.

3. Spark machining apparatus comprising, a workpiece support and a tool electrode support movable relatively to each other, a rotary electric motor, transmission means of high velocity ratio and affording only negligible lost motion connecting said motor and at least one of said supports, to maintain a workpiece and tool when respectively supported thereby spaced apart from each other by a spark gap, said motor having a rotor and a low resistance winding controlling, according to the direction of direct current flow therethrough, the direction of rotation of said rotor, a source of direct current comprising an alternating current supply circuit including a transformer having a secondary winding of low impedance and a rectifier circuit fed therefrom, said secondary winding having a tapping point substantially at its electrical centre, a spark charge condenser having a positively charged plate and a negatively charged plate, a charging circuit connecting said source and said condenser and including means controlling the rate of charging of said condenser, a discharge circuit connecting said positively and negatively charged plates with said workpiece and tool electrode supports respectively, whereby said condenser is repeatedly discharged by passage of a spark across said spark gap and re-charged after each such discharge, said winding of said motor being connected electrically between said tapping point and one plate of said condenser, to complete a circuit through said low resistance winding having sufficiently low resistance to limit over-run of said motor to a small value, and thereby maintain said length of said spark gap substantially constant.

4. Spark machining apparatus comprising, a workpiece support and a tool electrode support movable relatively to each other, a rotary electric motor, transmission means of high velocity ratio and affording only negligible lost motion connecting said motor and at least one of said supports, to maintain a workpiece and tool when respectively supported thereby spaced apart from each other by a spark gap, said motor having a rotor and a low resistance winding controlling, according to the direction of direct current flow therethrough, the direction of rotation of said rotor, a source of direct current, a spark charge condenser having a positively charged plate and a negatively charged plate, a charging circuit connecting said source and said condenser and including means controlling the rate of charging of said condenser, a discharge circuit connecting said positively and negatively charged plates with said workpiece and tool electrode supports respectively, whereby said condenser is repeatedly discharged by passage of a spark across said spark gap and re-charged after each such discharge, said discharge circuit having a connection point for one end of said low resistance winding, this connection point having a voltage wave form comprising a series of discharge wave fronts with intervening recovery wave fronts the peak value of the voltage varying with the length of said spark gap, said supply source having a connection point for the other end of said low resistance winding between which point and output terminals of the supply source the latter affords low resistance, an inductive impedance of low resistance connected in series with said low resistance winding between said connection points to complete a circuit through said low resistance winding having sufficiently low resistance to limit over-run of said motor to a small value, and thereby maintain said length of said spark gap substantially constant, while limiting the amplitude of any component of alternating current in the last said circuit.

5. Spark machining apparatus comprising, a workpiece support and a tool electrode support movable relatively to each other, a rotary electric motor, transmission means of high velocity ratio and affording only negligible lost motion connecting said motor and at least one of said supports, to maintain a workpiece and tool when respectively supported thereby spaced apart from each other by a spark gap, said transmission means comprising at least one stage of friction gearing including input and output elements having untoothed transmission faces in rolling contact wtih each other, and pressure applying means maintaining said faces in non-slipping relation with each other, said motor having a rotor and a low resistance winding controlling, according to the direction of direct current flow therethrough, the direction of rotation of said rotor, a source of direct current, a spark charge condenser having a positively charged plate and a negatively charged plate, a charging circuit connecting said source and said condenser and including means controlling the rate of charging of said condenser, a discharge circuit connecting said positively and negatively charged plates with said workpiece and tool electrode supports respectively, whereby said condenser is repeatedly discharged by passage of a spark across said spark gap and re-charged after each such discharge, said discharge circuit having a connection point for one end of said low resistance winding, this connection point having a voltage wave form comprising a series of discharge wave fronts with intervening recovery wave fronts the peak value of the voltage varying with the length of said spark gap, said supply source having a connection point for the other end of said low resistance winding between which point and output terminals of the supply source the latter affords low resistance, said low resistance winding being connected between said connection points, to complete a circuit through said low resistance winding having sufficiently low resistance to limit over-run of said motor to a small value, and thereby maintain said length of said spark gap substantially constant.

6. Spark machining apparatus comprising, a workpiece support and a tool electrode support movable relatively to each other, a rotary electric motor, transmission means of high velocity ratio and affording only negligible lost motion connecting said motor and at least one of said supports, to maintain a workpiece and tool when respectively supported thereby spaced apart from each other by a spark gap, said transmission means comprising at least one stage of friction gearing including input and output elements of which the former is a driven roller, said input and output elements having untoothed transmission faces in rolling contact with each other, and pressure applying means maintaining said faces in non-slipping relation with each other, comprising a backing member in rolling engagement with said roller on the side thereof opposite to that on which it engages the transmission face of said output element, said motor having a rotor and a low resistance winding controlling, according to the direction of direct current flow therethrough, the direction of rotation of said rotor, a source of direct current, a spark charge condenser having a positively charged plate and a negatively charged plate, a charging circuit connecting said source and said condenser and including means controlling the rate of charging of said condenser, a discharge circuit connecting said positively and negatively charged plates with said workpiece and tool electrode supports respectively, whereby said condenser is repeatedly discharged by passage of a spark across said spark gap and re-charged after each such discharge, said discharge circuit having a connection point for one end of said low resistance winding, this connection point having a voltage wave form comprising a series of discharge wave fronts with intervening recovery wave fronts the peak value of the voltage varying with the length of said spark gap, said supply source having a connection point for the other end of said low resistance winding between which point and output terminals of the supply source the latter affords low resistance, said low resistance winding being connected between said connection points, to complete a circuit through said low resistance winding having sufficiently low resistance to limit over-run of said motor to a small value, and thereby maintain said length of said spark gap substantially constant.

7. Spark machining apparatus comprising a workpiece support and a tool electrode support movable relatively to each other, a rotary electric motor operatively connected with at least one of said supports through transmission means of high velocity ratio and affording negligible lost motion, to maintain a workpiece and tool electrode when supported thereby spaced apart by a spark gap, said motor having a low resistance winding controlling according to the direction of direct current flow therethrough the direction of rotation of the rotor, a source of direct current comprising an alternating current supply circuit and a rectifier circuit connected between the output thereof and a charging circuit to provide a rectified but unsmoothed current output to said charging circuit a spark charge condenser, said charging circuit connecting said condenser to said rectifier circuit and including means controlling the rate of charging of said condenser, said condenser having a positively charged plate and a negatively charged plate, a discharge circuit connecting said positively and negatively charged plates with said workpiece and tool electrode supports respectively, whereby said condenser is repeatedly discharged by passage of a spark between said tool electrode and said workpiece and re-charged after each such discharge, a shock excited oscillatory circuit adapted to generate an oscillatory voltage in response to each spark discharge across said spark gap, said oscillatory circuit being connected with said condenser to superimpose said oscillatory voltage on the recovery voltage of said condenser following spark discharge, said oscillatory voltage having a magnitude and frequency such as to hold or carry the resultant voltage across said condenser below an arc extinguishing value for said spark gap in the period following said spark discharge, said supply source having a connection point for the other end of said low resistance winding between which point and output terminals of the supply source the latter affords low resistance, said low resistance winding being connected between said connection points, to complete a circuit through said low resistance winding having sufficiently low resistance to limit over-run of said motor to a small value, and thereby maintain said length of said spark gap substantially constant.

8. In spark machining apparatus comprising a workpiece support and a tool electrode support movable relatively to each other by feed means to maintain a workpiece and a tool electrode spaced apart by a spark gap; the combination of, a source of direct current, a spark charge condenser having a positively charged plate and a negatively charged plate, a charging circuit including permanently active conductor means connecting said spark charge condenser continuously with said source, and including means controlling the rate of charging of said condenser from said source, a discharge circuit connecting said positively and negatively charged plates with said workpiece and tool electrode supports respectively, and, an oscillatory circuit connected in shock excitation relation with said condenser whereby it is brought into operation automatically upon each spark discharge, and connected with said charging circuit to inject therein an oscillatory voltage having a magnitude and frequency such as to hold or carry the voltage across said condenser below an arc extinguishing value for said spark gap in the period following said spark discharge.

9. In spark machining apparatus comprising a workpiece support and a tool electrode support movable relatively to each other by feed means to maintain a workpiece and a tool electrode spaced apart by a spark gap; the combination of, a source of direct current, a spark charge condenser having a positively charged plate and a negatively charged plate, a charging circuit including permanently active conductor means connecting said spark charge condenser continuously with said source, and including means controlling the rate of charging of said condenser from said source, a discharge circuit connecting said positively and negatively charged plates with said workpiece and tool electrode supports respectively, and including a branch common with said charging circuit, an oscillatory circuit including an inductance and a condenser connected in parallel with each other to form a parallel tuned circuit and connected in said common branch to be shock excited by spark discharge, and inject in said common branch an oscillatory voltage having a magnitude and frequency such as to hold or carry the voltage across said condenser below an arc extinguishing value for said spark gap in the period following said spark discharge.

10. In spark machining apparatus comprising a workpiece support and a tool electrode support movable relatively to each other by feed means to maintain a workpiece and a tool electrode spaced apart by a spark gap; the combination of, a source of direct current, a spark charge condenser having a positively charged plate and negatively charged plate, a charging circuit including permanently active conductor means connecting said spark charge condenser continuously with said source, and including means controlling the rate of charging of said condenser from said source, a discharge circuit connecting said positively and negatively charged plates with said workpiece and tool electrode supports respectively, and, an oscillatory circuit connected in series with said source and condenser in said charging circuit, means coupling said oscillatory circuit inductively with said discharge circuit to receive shock excitation therefrom, whereby said oscillatory circuit injects into said charging circuit an oscillatory voltage having a magnitude and frequency such as to hold or carry the voltage across said condenser below an arc extinguishing value for said spark gap in the period following said spark discharge.

11. In spark machining apparatus comprising a workpiece support and a tool electrode support movable relatively to each other by feed means to maintain a workpiece and a tool electrode spaced apart by a spark gap; the combination of, a source of direct current, a spark charge condenser having a positively charged plate and a negatively charged plate, a charging circuit including permanently active conductor means connecting said spark charge condenser continuously with said source, and including means controlling the rate of charging of said condenser from said source, a discharge circuit connecting said positively and negatively charged plates with said workpiece and tool electrode supports respectively, and, an oscillatory circuit including an inductance and a condenser connected in parallel with each other to form a parallel tuned circuit, said oscillatory circuit being connected in series with said source and condenser in said charging circuit, a ring of magnetically conductive material interlinked with said inductance and said discharge circuit to provide inductive coupling between said oscillatory circuit and said discharge circuit whereby said oscillatory circuit is shock excited upon spark discharge and injects in said charging circuit an oscillatory voltage having a magnitude and frequency such as to hold or carry the voltage across said condenser below an arc extinguishing value for said spark gap in the period following said spark discharge.

12. In spark machining apparatus comprising a workpiece support and a tool electrode support movable relatively to each other by feed means to maintain a workpiece and a tool electrode spaced apart by a spark gap; the combination of, a source of direct current, a spark charge condenser having a positively charged plate and a negatively charged plate, a charging circuit including permanently active conductor means connecting said spark charge condenser continuously with said source, and including means controlling the rate of charging of said condenser from said source, a discharge circuit connecting said positively and negatively charged plates with said workpiece and tool electrode supports respectively, and, an oscillatory circuit including an inductance and a condenser connected in parallel with each other to form a parallel tuned circuit, said oscillatory circuit being connected in series with said source and condenser in said charging circuit, a ring of magnetically conductive material interlinked with said inductance and said discharge circuit and of a material and cross-sectional dimensions to become saturated magnetically during shock excitation of said oscillatory circuit in the period following said spark discharge.

13. In spark machining apparatus comprising a workpiece support and a tool electrode support movable relatively to each other by feed means to maintain a workpiece and a tool electrode spaced apart by a spark gap; the combination of, a source of direct current, including means for periodically reducing the voltage thereof below arc extinguishing value with respect to said spark gap, a spark charge condenser having a positively charged plate and a negatively charged plate, a charging circuit including permanently active conductor means connecting said spark charge condenser continuously with said source, and including means controlling the rate of charging of said condenser from said source, a discharge circuit connecting said positively and negatively charged plates with said workpiece and tool electrode supports respectively, and, an oscillatory circuit connected in shock excitation relation with said condenser whereby it is brought into operation automatically upon each spark discharge, and connected with said charging circuit to inject therein an oscillatory voltage having a magnitude and frequency such as to hold or carry the voltage across said condenser below an arc extinguishing value for said spark gap in the period following said spark discharge.

14. In spark machining apparatus comprising a workpiece support and a tool electrode support movable relatively to each other by feed means to maintain a workpiece and a tool electrode spaced apart by a spark gap; the combination of a source of direct current including an alternating current supply circuit and a rectifier circuit connected thereto to provide a rectified but unsmoothed current output, a spark charge condenser having a positively charged plate and a negatively charged plate, a charging circuit including permanently active conductor means connecting said spark charge condenser continuously with said source, and including means controlling the rate of charging of said condenser from said source, a discharge circuit connecting said positively and negatively charged plates with said workpiece and tool electrode supports respectively, and, an oscillatory circuit connected in shock excitation relation with said condenser whereby it is brought into operation automatically upon each spark discharge, and connected with said charging circuit to inject therein an oscillatory voltage having a magnitude and frequency such as to hold or carry the voltage across said condenser below an arc extinguishing value for said spark gap in the period following said spark discharge.

References Cited in the file of this patent
UNITED STATES PATENTS

| | | |
|---|---|---|
| 2,773,168 | Williams | Dec. 4, 1956 |
| 2,779,859 | Mironoff | Jan. 29, 1957 |

UNITED STATES PATENT OFFICE
CERTIFICATE OF CORRECTION

Patent No. 2,886,693

May 12, 1959

Michael John Harris et al.

It is hereby certified that error appears in the printed specification of the above numbered patent requiring correction and that the said Letters Patent should read as corrected below.

Column 2, line 6, for "established" read -- establish --; column 5, line 42, for "60 millihenries" read -- 6 millihenries --; column 6, line 29, for the numeral "13" read -- 113 --; line 33, for the numeral "14" read -- 114 --; column 8, line 16, for "inch" read -- inches --; column 9, line 9, for "supporting" read -- supply --; column 13, line 44, strike out "negatively charged plate, a charinging circuit including".

Signed and sealed this 30th day of August 1960.

(SEAL)
Attest:

ERNEST W. SWIDER
Attesting Officer

ROBERT C. WATSON
Commissioner of Patents